United States Patent [19]

Weimer

[11] 3,763,480

[45] Oct. 2, 1973

[54] DIGITAL AND ANALOG DATA HANDLING DEVICES

[75] Inventor: Paul Kessler Weimer, Princeton, N.J.

[73] Assignee: RCA Corporation, New York, N.Y.

[22] Filed: Oct. 12, 1971

[21] Appl. No.: 188,070

[52] U.S. Cl.......... 340/173 R, 307/221 C, 307/222, 307/224, 317/235 A, 340/173 SM

[51] Int. Cl......................... G11c 11/40, G11c 19/00

[58] Field of Search............ 307/293, 221 C, 221 R, 307/222, 223, 224, 225; 328/122; 340/173 R, 174 SR

[56] References Cited

UNITED STATES PATENTS

| | | | |
|---|---|---|---|
| 3,493,939 | 2/1970 | Dunn | 340/173 R |
| 3,619,642 | 11/1971 | Dunn | 307/221 |
| 3,643,106 | 2/1972 | Berwin | 307/221 |

*Primary Examiner*—Terrell W. Fears
*Attorney*—H. Christoffersen

[57] ABSTRACT

Charge transfer circuits in which a group of serially occurring signals initially are stored in a first charge storage register; then are transferred in parallel to parallel registers to permit, after each transfer, the first register again to be filled with a following group of serially occurring signals; and in which each group of signals are transferred from the parallel registers to an output register to be read out, in series from the output register. Signals may be stored in the parallel registers for an extended period of time to provide a delay or memory function. In addition, charge transfer circuit means may be coupled to charge storage matrix arrays for forming memory arrays and to photo responsive arrays for forming image sensors.

22 Claims, 9 Drawing Figures

INVENTOR.
Paul K. Weimer
BY W. Christoffersen
ATTORNEY

INVENTOR.
Paul K. Weimer
BY
H. Christoffersen
ATTORNEY

INVENTOR.
Paul K. Weimer
BY W. Christoffersen
ATTORNEY

Patented Oct. 2, 1973 3,763,480

9 Sheets-Sheet 4

INVENTOR.
*Pual K. Weimer*
BY H. Christoffersen
ATTORNEY

INVENTOR.
Paul K. Weimer
BY H. Christoffersen
ATTORNEY

INVENTOR.
Paul K. Weimer
BY H. Christoffersen
ATTORNEY

Patented Oct. 2, 1973 3,763,480

9 Sheets-Sheet 7

INVENTOR.
Pual K. Weimer
BY
ATTORNEY

INVENTOR.
Paul K. Weimer
BY
[signature]
ATTORNEY

INVENTOR.
Paul K. Weimer

ATTORNEY

DIGITAL AND ANALOG DATA HANDLING DEVICES

BACKGROUND OF THE INVENTION

Recent developments have made possible the fabrication of extremely long, high density registers and/or delay lines capable of storing and propagating either analog or digital information.

One development, described in U.S. Pat. No. 3,546,490 issued to F. L. J. Sangster and entitled "Multi-Stage Delay Line Using Capacitor Charge Storage," relates to a "Bucket Brigade" delay line using the concept of transfer of charge from stage to stage. This bucket brigade approach presents a significant simplification in the fabrication and formation of extremely long analog or digital registers.

Similarly, charge coupled devices, as recently taught in the *Bell System Technical Journal* of April, 1970, page 587 et seq., by W. S. Boyle and G. E. Smith, lend themselves to the fabrication of serial registers of extremely great length.

In both of these development, the signals are propagated by charge transfer. In the case of the bucket brigade, charge is transferred from the source to the drain of a transistor in response to a clocking signal applied to the control electrode (gate) of the transistor. In the case of charge coupled devices, charge is transferred from underneath one control electrode to underneath an adjacent electrode in response to clocking signals applied to the control electrodes.

These two developments have been directed to the use of the registers and/or delay lines to translate information serially.

There are, however, some serious limitations to solely translating information along a single serial transmission path. One disadvantage, for example, is that every stage of the serial path must be operated at the same frequency. The frequency of operation is normally dictated by the frequency of the input signals which is normally very high. The time delay of a register is inversely proportional to the operating frequency. Therefore, to obtain a given time delay from the register many stages are required when the operating frequency is high. Another disadvantage of a single long serial shift register is that data must be transferred through each one of the many stages and that each stage attenuates the information being propagated. Also, the attenuation ratio increases as the frequency increases. As a result, the greater the length of the register chain the greater the attenuation of the signal. Another important disadvantage of long serial shift registers is that a fault along the line renders the whole register useless.

SUMMARY OF THE INVENTION

Shift registers, delay lines, image sensors and memories using the principal of charge transfer circuits. For the shift register and delay lines, the circuits are interconnected in a matrix array. Information is propagated in series along one path at a first rate and then transferred from said one path onto a plurality of parallel paths for propagation at a second rate. Alternately, information is propagated along parallel paths and then transferred to a series path for serial propagation of the information. In the memory systems information is written into a series register then transferred onto parallel paths from which the information is selectively loaded into charge storage elements. The information is then selectively read out of the storage elements and transferred onto the parallel paths from which it is in turn transferred into a series output register. In image sensors the elements may be scanned in parallel and the information then transferred to an output register to produce a serial output.

DETAILED DESCRIPTION OF THE INVENTION

Figure 1:
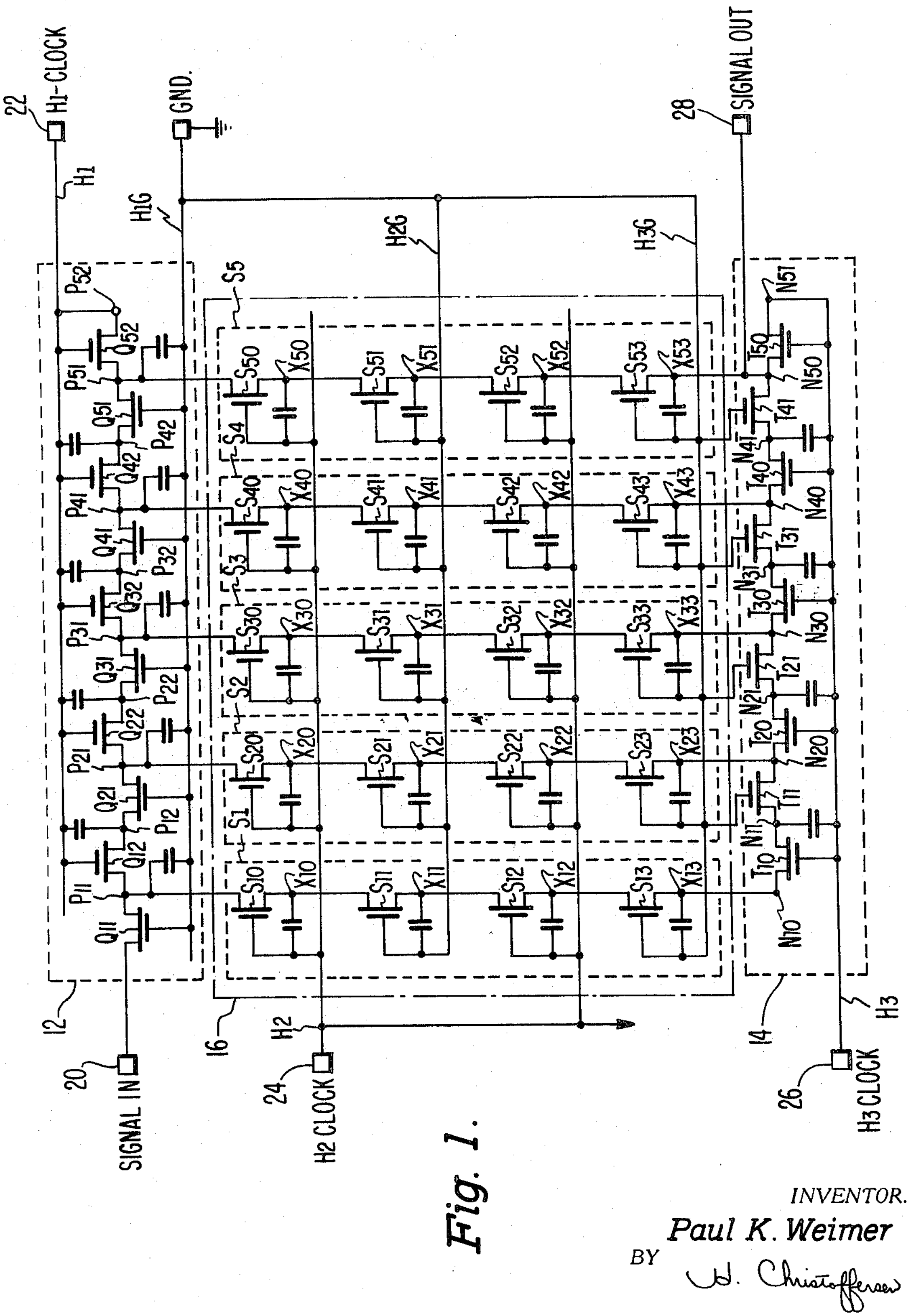
FIG. 1 is a schematic drawing of a system embodying the invention.

Structure of FIG. 1

The circuit of FIG. 1 includes an input shift register 12, an output register 14, and an array 16 of column registers ($S_1$, $S_2$, $S_3S_4$, $S_5$) coupled between the output nodes ($P_{11}$, $P_{21}$, $P_{31}$, $P_{41}$, $P_{51}$) of the input register 12 and the input nodes ($N_{10}$, $N_{20}$, $N_{30}$, $N_{40}$, $N_{50}$) of the output register 14.

Each register includes a row of transistors having their conduction paths connected in series. That is, the drain of one transistor is connected to, or is an integral part of the source of the adjacent transistor. The input register 12 includes insulated-gate field-effect transistors $Q_{11}$ through $Q_{52}$ with their source-to-drain paths connected in series between signal input terminal 20 and junction point $P_{52}$. The output register 14 includes transistors $T_{10}$ through $T_{50}$ with their source-to-drain paths connected in series between terminal $N_{10}$ and signal output terminal 28 which is also input node $N_{50}$. The array 16 of registers provides data transmission paths between input register 12, and output register 14. The five paths ($S_1$, $S_2$, $S_3$, $S_4$, $S_5$) include five parallel columns of transistors ($S_{10}$ through $S_{13}$; $S_{20}$ through $S_{23}$; $S_{30}$ through $S_{33}$; $S_{40}$ through $S_{43}$; and $S_{50}$ through $S_{53}$).

Each of the source-drain region forms a common region or junction point. Every two transistors comprise a stage and in the input and output registers every other junction point is used as an input or an output node and is denoted by a letter (P for the input register, N for the output register) with a two digit subscript number (e.g., $P_{11}$, $P_{12}$). The first digit denotes the order of the stage and the second digit denotes whether it is the first or the second transistor of the stage. The transistors in the array 16 are denoted by a letter (S) with a two digit subscript, the first digit denotes the column and the second digit the order of the transistor along the column. Junction points along the columns are denoted by the letter X with a two digit subscript corresponding to its transistors.

A capacitor ($C_{DG}$) which may be a discrete and/or a distributed component is coupled between the gate and drain electrode of each transistor. The capacitor performs a crucial role in the operation of the registers by storing charge during one phase of the clock signal and by alternating current (AC) coupling to the source/-drain node the clock signal applied to the gate.

The gate of every other transistor (the odd numbered transistors in FIG. 1) is connected to a grounded conductor ($H_{1G}$, $H_{2G}$, $H_{3G}$) and the gates of the remaining transistors (the even numbered transistors in FIG. 1) are connected to pulsed conductors ($H_1$, $H_2$, $H_3$).

Input information is serially applied to input terminal 20 connected to one end of the conduction path of transistor $Q_{11}$. The input information may be either analog or digital in nature. The registers transfer charge and are suitable to transfer linear or digital information.

A clock signal, denoted as the $H_1$-clock, is applied to terminal 22 which is connected to conductor $H_1$. The $H_1$ clock causes the signals applied at terminal 20 to be transferred along the row of transistors constituting the input register. A second clock signal, denoted as the $H_2$-clock, is applied to terminal 24 which is connected to conductor $H_2$. The $H_2$-clock controls the transfer of information from the input register to the parallel registers and also controls the propagation rate along the column registers. The $H_2$-clock normally is at a much lower frequency than the $H_1$-clock and in some applications it is preferred that it be a submultiple thereof. A third clock signal, denoted as the $H_3$-clock, is applied to terminal 26 which is connected to conductor $H_3$. The $H_3$-clock controls the transfer of information along the output register 14 and determines the rate at which signals are produced at signal output terminal 38 ($N_{50}$).

Detailed Description of the Operation of the Circuit

The transistors in the circuit of FIG. 1 are of the N-conductivity type (conduct when the gate is positive with respect to the source). In the description of the circuit it is assumed that the threshold voltage ($V_T$) of the transistors is zero volts. The assumption that $V_T$ is zero is not required but it simplifies the explanation of the operation. In any event, a finite $V_T$ causes a constant DC offset which does not prevent the signals being propagated. It is also assumed that the gate-to-drain capacitances ($C_{DG}$) of all the transistors are substantially equal, a reasonable assumption in view of the similarity of the structure and of the methods of making the transistors.

Figure 2:
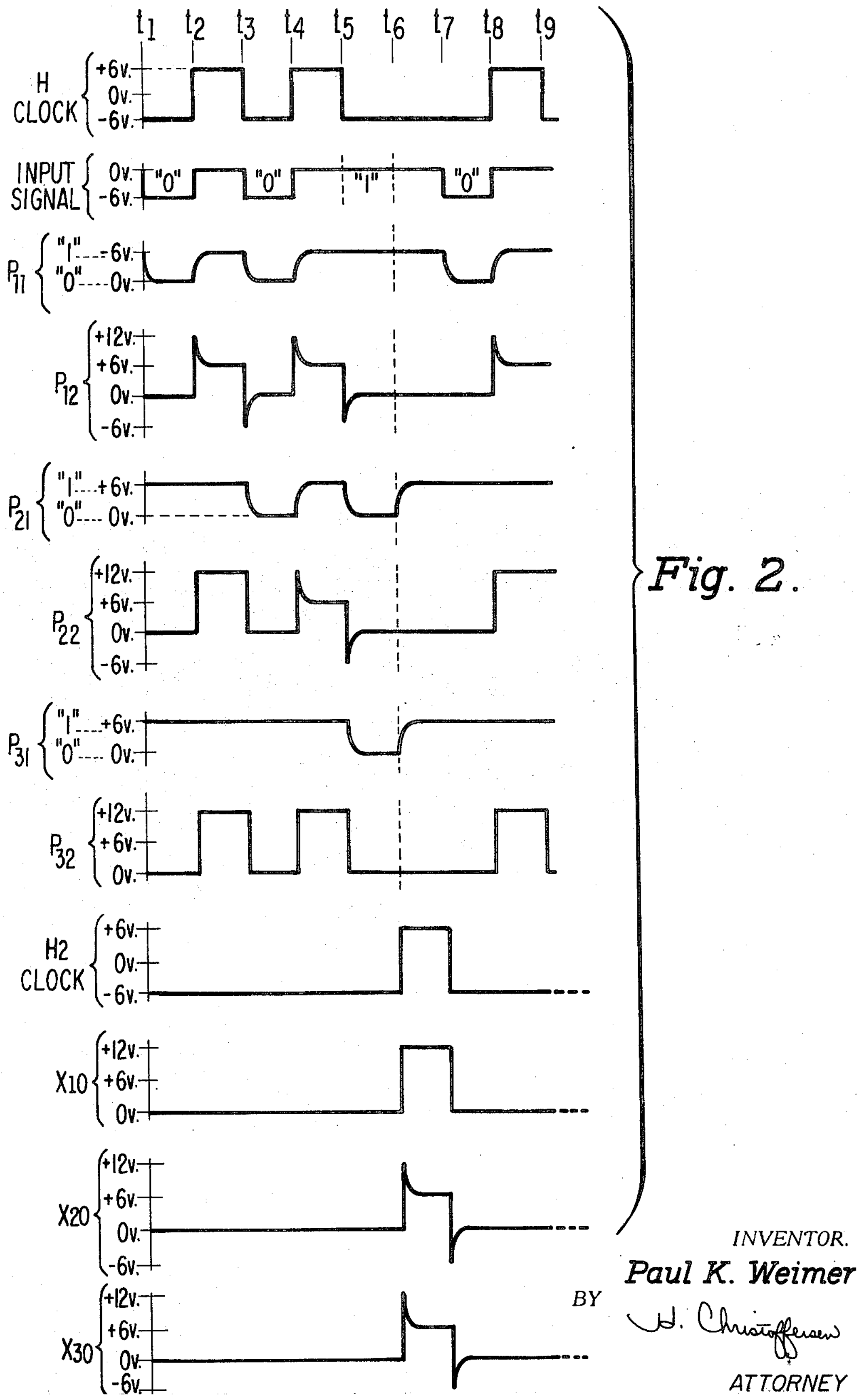
FIG. 2 is a drawing of waveforms present in the circuit of FIG. 1.

For a detailed explanation of the operation of the FIG. 1 circuit reference is made to the waveforms of FIG. 2.

For tutorial purposes, it is assumed that signals of the type shown in FIG. 2 are applied to terminal 20. That is, during the time intervals $t_1$ to $t_2$ and $t_3$ to $t_4$ the input signal is −6 volts and during $t_5$ to $t_6$ the input signal is zero volts. The use of digital signals is by way of example only since the register may transfer either analog or digital signals.

Assume also that at time $t_1$ the even numbered junction points of the input register 12 (i.e., $P_{12}$, $P_{22}$,...) are at zero volts and that the odd numbered junction points (i.e., $P_{11}$, $P_{21}$, $P_{31}$) are at +6 volts (which is arbitrarily defined as logic "1"). Assume also as shown in FIG. 2 that the $H_1$ and $H_2$ clocks are at −6 volts.

Information is loaded into the input register as follows. When an input signal of −6 volts is applied to terminal 20 (e.g., at time $t_1$ to $t_2$ and $t_3$ to $t_4$) transistor $Q_{11}$ turns on since its gate ($H_{1G}$) is at ground potential. Transistor $Q_{11}$ with its drain ($P_{11}$) initially at +6 volts conducts until the potential at $P_{11}$ is discharged to zero volts. At this point it cuts off with the charge deficit (represented by the input signal of −6 volts) transferred to its drain whose potential decreases from +6 volts to zero volts. When the input signal applied to terminal 20 is zero volts or more, transistor $Q_{11}$ remains cut off and its drain remains charged to +6 volts. Input signals are normally synchronized to the $H_1$-clock. In this embodiment signals are loaded into the register when the $H_1$-clock makes a negative going transition.

When the $H_1$ clock makes a negative going transition, the information in register 12 is advanced from the even numbered nodes to the odd numbered nodes, and when the $H_1$-clock makes a positive going transition the information is advanced from the odd numbered nodes to the even numbered nodes. This is described in greater detail in the following sections numbered 1 through 4.

1. Transition of $H_1$-Clock from −6 Volts to +6 Volts:

Every positive going transition of the $H_1$-clock (from −6 volts to +6 volts) applies +6 volts to the gate electrodes of the even numbered transistors ($Q_{12}$, $Q_{22}$...) and raises their drain potential (the even numbered junction points $P_{12}$, $P_{22}$...) to +12 volts. The rise in drain potential is due to the $C_{DG}$ of the transistors which couples the +12 volts transition of the $H_1$ clock to the drain. Since the voltage across a capacitor cannot change instantaneously, the transition of the clock pulse is coupled from one side of the capacitor to the other.

The effect of the positive going transition of the $H_1$ clock on the even numbered junction points is illustrated in FIG. 2 where it is seen that at times $t_2$, $t_4$, and $t_8$ the even numbered nodes ($P_{12}$, $P_{22}$, and $P_{32}$...) are driven from zero volts to +12 volts.

All the even numbered transistors are thus biased in a direction to conduct and will conduct in the source follower mode in response to a signal (any voltage less than +6 volts) present at their source electrodes (the odd numbered junction points).

During this time interval the odd numbered transistors are turned off since their gate electrodes are at ground potential while the potential at their source and drain electrodes is more positive than ground potential.

2. $H_1$-Clock at +6 Volts Level:

Following the positive going transition of the $H_1$ clock and during the time interval the $H_1$ clock is at its positive level all the even numbered transistors whose source potential is less than +6 volts conduct. The even numbered transistors that conduct transfer charge from the capacitor present at their drains to the capacitor present at their source. Since the capacitors are assumed to be substantially equal, the resulting increase in potential at the source results in an equal decrease in the potential at the drain of the transistor.

This is shown in FIG. 2 during the time interval from time $t_2$ to $t_3$ when transistor $Q_{12}$ conducts in the source follower mode causing the potential at its source ($P_{11}$) to rise exponentially to +6 volts and the potential at its drain ($P_{12}$) to correspondingly decrease exponentially from +12 volts to +6 volts. Similarly, during the time interval from $t_4$ to $t_5$, $Q_{12}$ and $Q_{22}$ conduct and nodes $P_{11}$ and $P_{21}$ are driven exponentially to +6 volts while nodes $P_{12}$ and $P_{22}$, correspondingly, decrease exponentially from +12 volts to +6 volts. Nodes $P_{31}$ and $P_{32}$ remain at +6 volts and +12 volts, respectively, since transistor $Q_{32}$ is cut off.

During this phase of the clocking signal ($H_1$ at +6 volts) the input information is advanced one node up along the register chain from the sources of the odd numbered transistors of register 12 to the sources of the adjacent even numbered transistors where it remains until the next clock transition. At the end of this phase of the clock pulse all the source nodes (odd numbered junction points) of the even numbered transistors are charged up to +6 volts while the drains of the even numbered transistors are discharged by the amount of the signal which was present at the source nodes prior to the positive going transition of the $H_1$ clock.

During this time interval, the odd numbered transistors remain cut off since their gate potential is at zero volts while their source and drain electrodes are at or above ground potential.

3. Transition of $H_1$-Clock from +6 Volts to −6 Volts:

When the $H_1$ clock goes negative from +6 volts to −6 volts the even numbered transistors are cut off and the odd numbered transistors of register 12 are turned on. A negative potential of −6 volts is applied to the gates of the even numbered transistors cutting them off. Simultaneously, a −12 volts pulse is coupled to the sources of the odd numbered transistors (the even numbered junction points) through the capacitors connected to conductor $H_1$. This is shown in FIG. 2 where at time $t_3$ node $P_{12}$ which had previously been discharged to +6 volts is decreased by 12 volts to −6 volts and those junction points which had not been discharged (e.g., $P_{22}$, $P_{32}$) are returned to zero volts. Similarly, at time $t_5$, nodes $P_{12}$ and $P_{22}$ are driven from +6 volts to −6 volts while $P_{32}$ is driven from +12 volts to zero volts. Thus, the potential at the source of the odd numbered transistors may be equal to or less than zero volts. Those odd numbered transistors whose source potential is below zero volts are turned on. Those whose source potential is at zero do not conduct since their gate ($H_{1G}$) potential is also zero volts.

4. $H_1$-Clock at −6 Volts Level:

During the time interval the $H_1$ clock is at the −6 volt level, the odd numbered transistors whose source potential is below zero volts conduct. For example, from time $t_3$ to $t_4$ transistor $Q_{21}$ is turned on and conducts in the source follower modes since its source ($P_{12}$) is at −6 volts while its gate ($H_{1G}$) is at zero volts. Transistor $Q_{21}$ ceases to conduct when the potential at its source ($P_{21}$) which initially was +6 volts equals its gate potential (0 volts). At that time there has occurred a transfer of charge from the $C_{DG}$ of transistor $Q_{12}$ to the $C_{DG}$ of transistor $Q_{21}$. This is illustrated for the time period $t_3$ to $t_4$ in FIG. 2 by the exponential decrease in potential at $P_{21}$ from +6 volts to zero volts and the exponential increase in potential at node $P_{12}$ from −6 volts to zero volts.

Similarly from time $t_5$ to $t_6$ transistors $Q_{21}$ and $Q_{31}$ conduct transferring the charge present at their source nodes ($P_{12}$ and $P_{22}$, respectively) to their drain nodes ($P_{21}$ and $P_{31}$, respectively). This is illustrated in FIG. 2 where from time $t_5$ to $t_6$, the potential at $P_{21}$ and $P_{31}$ increases exponentially to zero volts while the potential at $P_{12}$ and $P_{22}$ rises correspondingly from −6 volts to zero volts.

Transfer of Information From Series Register to Parallel Registers

The transfer of the information contained in the first three stages of series register 12 to the parallel paths of array 16 is now described. Assume as shown in FIG. 2 that just prior to time $t_6$ that $P_{11}$ is at +6 volts (logic "1") and that nodes $P_{21}$ and $P_{31}$ are at zero volts (logic "0").

The positive going transition of the $H_2$ clock transfers the information from input register 12 into the parallel registers $S_1$ through $S_5$ (note that the $H_1$ clock is at the −6 volts level). When the $H_2$ clock goes from −6 volts to +6 volts, it applies +6 volts to the gates of the even numbered transistors of array 16 and couples a positive pulse of 12 volts amplitude to their drains (the even numbered nodes in array 16). For example, as shown in FIG. 2 the potential at $X_{10}$, $X_{20}$, and $X_{30}$ goes from zero volts to +12 volts at time $t_6$.

When the $H_2$ clock is at the +6 volt level, the even numbered transistors of array 16 conduct if the potential at their source electrode is less than +6 volts. For the assumed input signals, transistors $S_{20}$ and $S_{30}$ conduct, since their sources (nodes $P_{21}$ and $P_{31}$) are initially at zero volts, and transfer charges from their drain nodes to their source nodes. As shown in FIG. 2 nodes $X_{20}$ and $X_{30}$ decay exponentially from +12 volts to +6 volts while nodes $P_{21}$ and $P_{31}$ rise exponentially from zero volts to +6 volts. Transistor $S_{10}$ does not conduct since its source (node $P_{11}$) is at +6 volts and $X_{10}$ remains at +12 volts.

The information present at each output node of register 12 is thus transferred to a different one of the parallel registers, $S_1$ through $S_5$ and the input register is reset to its original condition. That is, each of the odd numbered junction points of register 12 is recharged to +6 volts. Each node (e.g., $P_{11}$) of the input register may be viewed as having two branches (e.g., $Q_{12}$ and $S_{10}$) which may be selectively enabled by one or the other of two clock signals (e.g., $H_1$ clock, $H_2$ clock). The information present at a node may thus be routed to either one of the two branches.

The operation of the column registers in array 16 is identical to that of input register 12 in that each transition of the $H_2$ clock causes the information to advance from node to node.

Eventually, the information in array 16 arrives at and gets stored at nodes $X_{13}$ through $X_{53}$. Note that these nodes are identical to the even numbered input nodes of output register 14.

Transfer of Information From Parallel Registers to Series Registers

A positive going $H_3$ clock pulse applied to the $H_3$ line causes the information contained in the last nodes ($X_{13}$ ... $X_{53}$) of the parallel registers to be transferred along the output register while recharging the nodes ($X_{13}$ ... $X_{53}$). For example, assume that $X_{13}$ is at +6 volts and that $X_{23}$ and $X_{33}$ are at 0 volts. With the $H_3$ clock at +6 volts, the even numbered transistors of the output register 14 are turned on. For the assumed signal condition transistor $T_{10}$ remains nonconductive and node $N_{11}$ remains charged to −12 volts, and transistors $T_{20}$ and $T_{30}$ conduct causing nodes $X_{23}$ and $X_{33}$ to rise exponentially from zero volts to +6 volts and nodes $N_{21}$ and $N_{31}$ to discharge from +12 volts to +6 volts. Additional transitions of the $H_3$ clock cause the further advance of the information along the output register.

When information is transferred from the parallel registers to the output register, the last stage of the parallel registers is reset to +6 volts. Until the next $H_2$ clock pulse no new information is transferred to the output register. Subsequent transitions of the $H_3$ clock advance the information in the output register until every bit is read out serially at output terminal 28.

The information flowing in parallel in array 16 is thus serially converted. Each node (e.g., $N_{20}$) of the output register may also be viewed as having two branches (e.g., $S_{23}$, $T_{11}$) connected thereto. These branches are selectively enabled by a clock pulse (e.g., $H_2$ clock, $H_3$ clock) and signal is transferred to the node through that branch which is enabled.

SUMMARY OF THE OPERATION

Signals applied to terminal 20 are propagated along the input register 12 by the $H_1$ clock until all the stages of register 12 are filled. An $H_2$ clock pulse then transfers the information contained at the output nodes of the input register 12 to the first stage of the respective column registers $S_1$ through $S_5$. This constitutes a series-to-parallel conversion of the data contained in the input register. Simultaneously the input register is reset to its initial condition. The information in the column registers is then serially propagated along each of the registers $S_1$ through $S_5$ at a rate determined by the $H_2$ clock.

After the reading out and resetting of register 12, the process of filling the input register with new information begins again. When, for example, the input register is filled, for the second time, a second $H_2$ clock pulse may be used to advance the information contained in the column registers and to simultaneously transfer the information from the input register to the first stage of the column registers. The column registers are eventually filled and information present in the last stage ($S_{13}$, $S_{23}$, $S_{33}$, $S_{43}$, and $S_{53}$) is applied to the input nodes of output register 14. An $H_3$ clock pulse applied to the output register 14 advances the information along the register. This constitutes a parallel-to-serial conversion of the data contained in the parallel registers.

The $H_3$ clock will normally have to be much faster than the $H_2$ clock in order to clear the information out of the output register 14 before the next $H_2$ clock pulse refills the input nodes of the output register.

The series-to-parallel-to-series flow pattern for charge transfer arrays illustrated in FIG. 1 and discussed above is of great importance in at least the following two areas: 1) digital memories; and 2) video delay lines.

With respect to digital memories, a word of information propagated at a first relatively fast rate may be clocked into input register 12. This word may be then transferred to parallel registers and stored in a row of the parallel registers for a relatively long period of time. Information may be stored in each row of the parallel registers which may thus be used to form a large dynamic word organized memory operated on the first-in, first-out principle. The information contained in the parallel registers is read out by means of an output register which can be operated at said first rate or at some other rate. The information contained in the parallel registers could be periodically recycled by coupling the output of the output register to the input register and again clocking the information into the array.

The circuit embodying the invention may also be used to replace a long shift register. For example, a shift register having $n^2$ nodes would require $n^2-1$ total transfers of information in order to transfer a bit of information from the input to the output. A shift register embodying the invention could be organized as a square matrix having an input register and an output register each having n nodes and n parallel paths each with n nodes. In contrast to the prior art shift register requiring $n^2-1$ transfers only 2 $(n-1)$ transfers would be required in a shift register embodying the invention. The total number of transfers is drastically reduced.

Secondly, in the long shift register all the transfers occur at the same and normally very fast rate. In circuits embodying the invention those transfers taking place in the parallel registers occur at a much slower rate. In fact, for the above example the frequency of operation of the parallel paths could be $1/n$ th the operating rate of the input register. Since transfers from one stage to the next require the transfer of charge from one capacitor to a succeeding capacitor through a conduction element, the transfer takes a finite time which follows an exponential charge or decay curve. As a result, the efficiency of the information transfer is dependent on the clocking rate. It is, therefore, advantageous to have less transfers and to have those transfers occur at a much slower rate.

Another distinct advantage of circuits embodying the invention is that instead of one long serial register the circuit provides a relatively short register with a multiplicity of branches. The multiple paths between the input and the output registers greatly increase the tolerance for defective stages. A long single channel register tolerates no defective stages. In contrast, to the large single channel register a defect in any of the parallel channels can be by-passed by modifications of the input signal timing or by subsequent discretionary metallization of the integrated circuit. A still more convenient method of introducing a redundancy into the circuit is by the use of duplicate parallel channels so that a defect in one does not interrupt the operation.

With respect to video delay lines, the system in FIG. 1 presents a considerable advantage over presently known delay line circuits. First, the bucket brigade using the charge transfer principle permits the fabrication of a shift register without much loss of signal. It is, therefore, not necessary to reamplify the signal being propagated after every few stages of transmission. Secondly, as discussed above for shift registers embodying the invention, a desired time delay may be obtained using many less transfers. Using less transfers at a slower rate saves on the number of amplification stages required. Most know circuits which perform the analog delay line function are either too expensive or do not permit the function of long delays. In contrast, a circuit embodying the invention may be used to delay analog signals efficiently and reliably. Whereas, in the prior art circuit the signal being delayed has to be transferred N times, where N is an integer, the signal in circuits embodying the invention are transferred approximately 2 × N times. Since some information is lost in every transfer, the difference between transferring a signal 200 times or 10,000 times is of considerable and fundamental importance.

Figure 3:
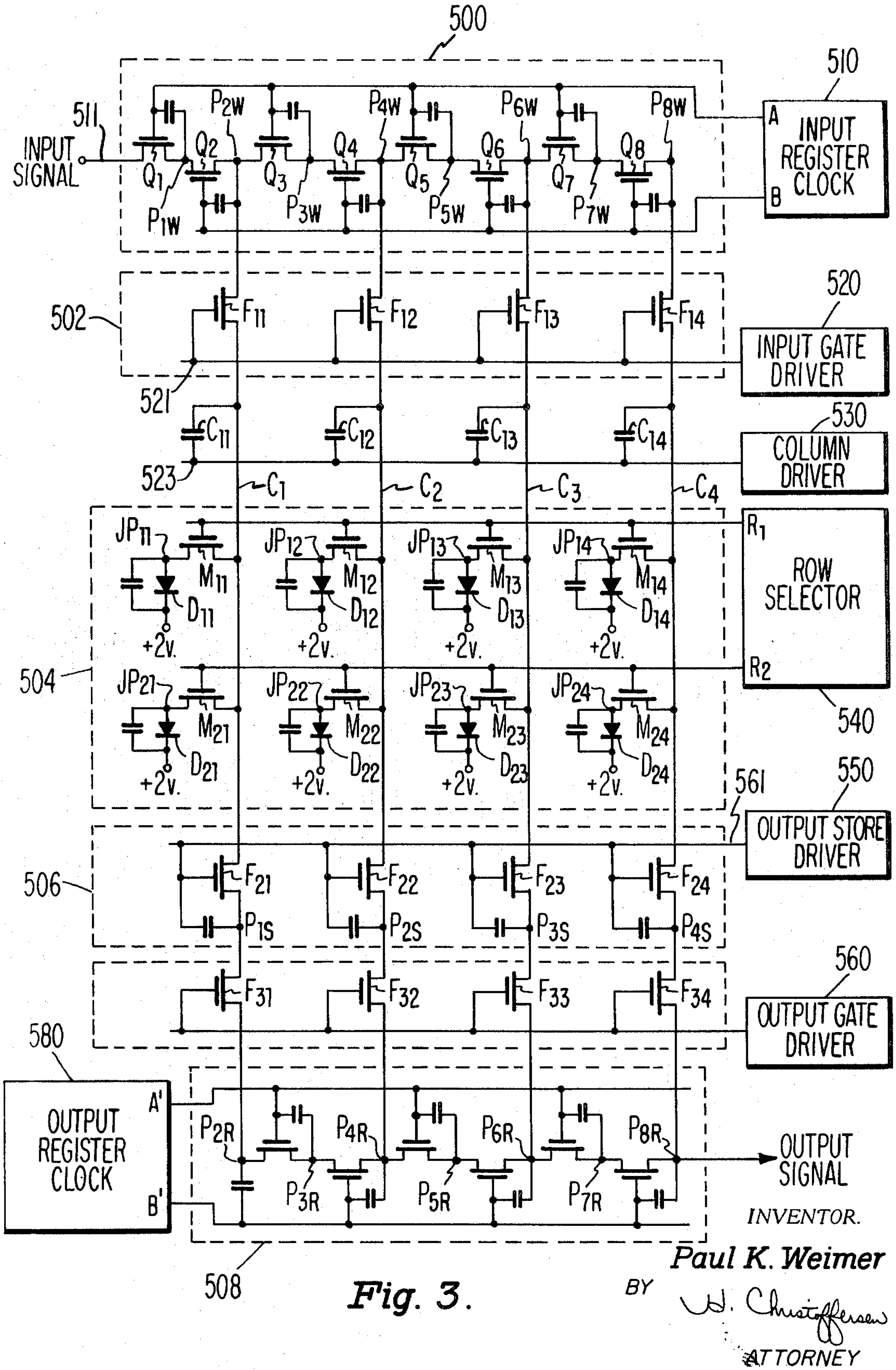
FIG. 3 is a schematic drawing of a memory system embodying the invention.

A word organized memory array using charge transfer to perform the write-in, store and read out functions is shown in FIG. 3. In the circuit of FIG. 3, P-type devices are used to illustrate the invention. That is, the devices are formed by the diffusion of P regions in an N-type substrate. To turn on P-type devices, their gate potential must be more negative than their source potential.

Input signals are applied to terminal 511 of input shift register 500 which is driven by the A and B clocks generated by input register clock 510. The information present at the output nodes (P2W, P4W, P6W, and P8W) of register 500 is transferred in parallel to columns C1, C2, C3, and C4 by means of gating transistors F11 through F14 which are controlled by input gate 520 which applies pulses to line 521. The columns are pulsed by means of a column driver 530 which applies pulses to line 523. The pulses are AC coupled to the columns by capacitors C11 through C14.

Memory array 504 shown having two rows (R1, R2) stores the information present on the columns in response to control pulses generated by row selector 540. Each bit position of the array includes a transistor (e.g., M12) whose gate is connected to a row conductor (e.g., R1) and whose conduction path is connected at one end to a column (e.g., C2) and at the other end (e.g., JP12) to a charge storage element (e.g., D12). The charge storage element is illustrated as a reverse biased diode whose cathode is connected to the substrate to which a positive bias is applied. The junction capacitance of the diode, shown connected across the diode, is used to store charge. The diode may be photo responsive, permitting the contents of the memory to be altered or set by photo signals. Alternatively, the anodes of the diodes could be capacitively coupled to separate conductors which could be pulsed. Also, the common substrate to which the cathodes of the diodes are connected could be pulsed.

Information contained in memory array 504 is read out a word at a time by means of output store transistors F21 through F24. Output store driver 550 applies pulses to line 561 which energizes transistors F21 through F24 thereby coupling the columns to output store points P1S through P4S. Output gate driver 560 controls the conduction of transistor F31 through F34 which couples the output store points to the input nodes of output register 508. The latter is driven by output clocks A' and B' produced by output register clock 580.

Figure 4:
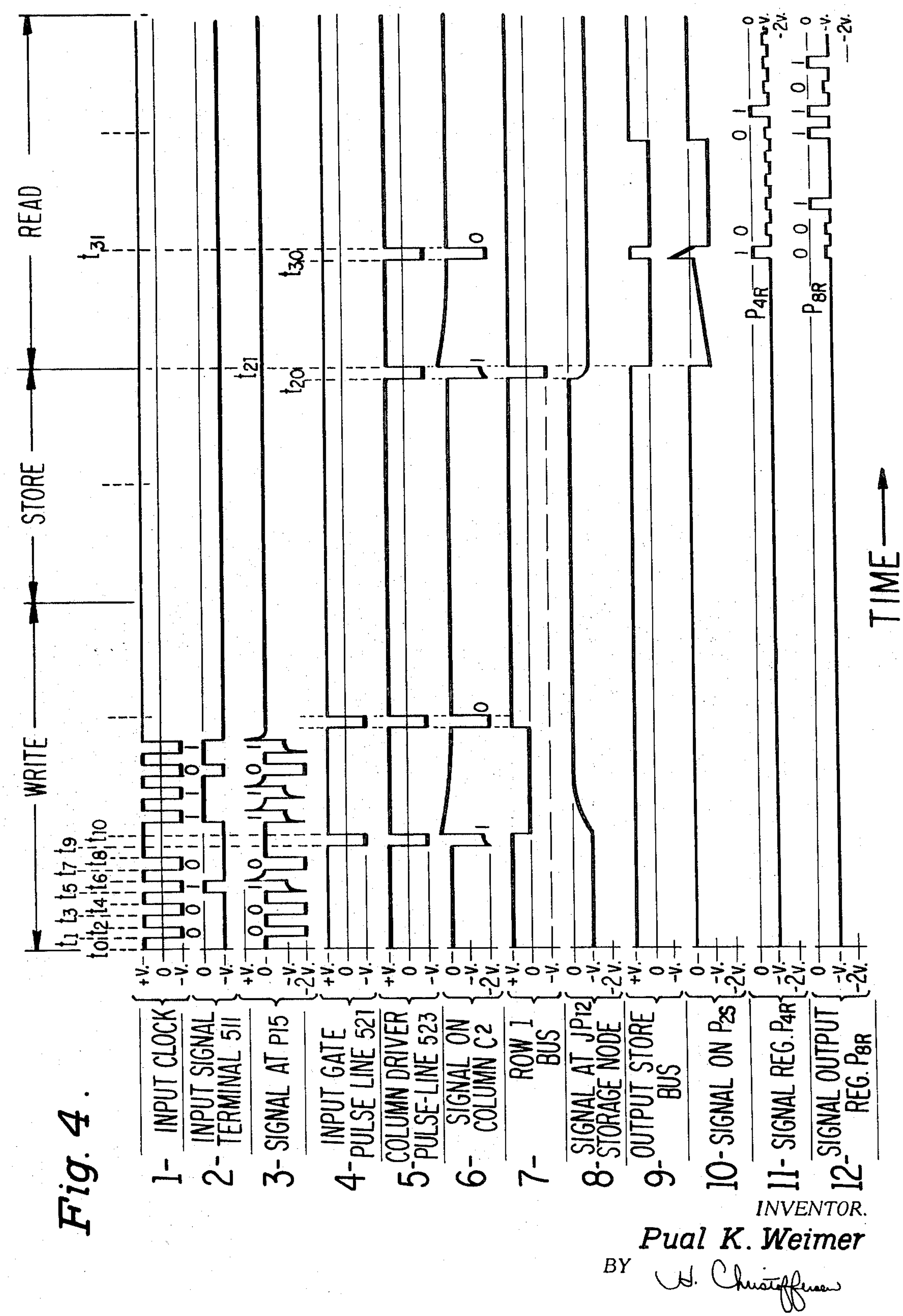
FIG. 4 is a drawing of waveforms present in the circuit of FIG. 3.

The operation of the circuit of FIG. 3 is best understood with reference to the waveforms shown in FIG. 4.

The input signals applied to terminal 511 are shifted serially along the register 500 by means of the A and B clock signals shown in waveshape 1 of FIG. 4. The B clock is maintained at zero volts and the A clock swings +V volts and −V volts about zero volts.

The negative going transitions of the A clock (e.g., at times $t_1$, $t_3$, $t_5$,...etc.) tend to turn on the odd numbered transistors (Q1, Q3, Q5, Q7) by applying −V volts to their gates and by causing −2V volts to be applied to their drains. The positive going transitions of the A clock tend to turn on the even numbered transistors (Q2, Q4, Q5, Q8) by causing their source potential to be raised by 2V volts.

Information is transferred from terminal 511 to node P1W when the A clock goes to −V volts. This applies −V volts to the gate of transistor Q1 and causes P1W to go to −2V volts. An input signal of −V volts (arbitrarily defined as logic "0") and applied, for example, at times $t_1$ to $t_2$ and $t_3$ to $t_4$ causes no change at P1W (it remains charged to −2V volts) since transistor Q1 does not conduct (its $V_{GS} = 0$). An input signal of zero volts (arbitrarily defined as logic "1") applied to terminal 511 causes the signal at P1W to charge up to −V volts at which point transistor Q1 ceases conducting. This is illustrated for time $t_5$ to $t_6$ of waveshape 3.

Assume for purposes of the explanation to follow that the signal input pattern shown in waveshape 2 is applied to input register 500. That is, there is applied at time $t_1$, $t_3$, and $t_7$ a logic "0" and at time $t_5$ a logic "1". These bits of information are propagated along the register by means of the A clock transitions. Therefore, just before time $t_9$ the signal level at P2W, P6W, and P8W is at −V volts (logic "0") and the signal level at P4W is at zero volts (logic "1"). These four bits of information represent the four digits of a binary word which is now to be stored in one of the rows of memory array 504.

During the time interval from $t_9$ to $t_{10}$ the information present at the output nodes of register 500 is transferred to the columns by transistors $F_{11}$ through $F_{14}$ which convert the information from a serial to a parallel format. At time $t_9$ input gate transistor $F_{11}$ through $F_{14}$ are turned on by the application of −V volts to their gates. This voltage is produced, (see waveform 4) by a negative going pulse generated by input gate driver 520. Concurrently, a negative going pulse generated by column driver 530 is applied to line 523. This pulse is coupled by means of capacitors C11 through C14 to the columns C1 through C4 causing the columns to go negative by −2V volts as shown in waveform 6 for column C2.

Transistors F11 through F14 now have −V volts applied to their gates and −2V volts applied to their drains (columns C1 through C4), Those input gate transistors (F11, F13, F14) having −V volts applied at their sources (P2W, P6W, P8W) do not conduct and their columns (C1, C3, C4) remain at −2V volts. Those input gate transistors (F12) having 0 volts applied to their sources (P2W) conduct in the source follower mode causing their column (C2) potential to rise above −2V volts. The information in series register 500 is thus transferred in parallel to columns C1 through C4.

At time $t_{10}$ the gating transistors F11 through F14 are cut off by the positive going portion of the input gate pulse applied to line 521. Concurrently, bus line 523 is also driven positive. The positive going portion of the pulse is coupled to the columns by means of the column capacitors (C11...C14) raising the column potential by 2V volts. Those columns (C1, C3, C4) which were at −2V volts are returned to zero volts. Those columns (e.g., C2) which had been charged up driven more positive than zero volts, as shown in waveshape 6, for the period after $t_{10}$.

At time $t_{10}$ the information present on the columns is transferred to the elements of memory array 504 by the application of a negative going pulse (+V volts to zero volts) to row R1 of memory array 504 as shown in waveshape 7 of FIG. 4. Transistors M11 through M14 are turned on by the application of zero volts to their gates. Assume that initially transistors M11 through M14 have their drains charged to −V volts (logic "0"). Those transistors (M11, M13, M14) whose columns (C1, C3, C4) are at zero potential do not conduct and their drains (e.g., JP11, JP13, JP14) remain at −V volts. Those transistors (M12) whose columns (C2) are above zero volts conduct causing the potential across the storage element (e.g., JP12) to rise exponentially towards zero volts (logic "1") as shown in waveshape 8 of FIG. 4. The information transfer from the columns to the elements may take up the full period during which the input register 500 is accumulating a new word. Since the efficiency of the transfer is time dependent, the extended time for transfer improves the efficiency of transfer.

The transfer of information from register 500 to the memory array 504 can be repeated with another row (e.g., row R2) of the array selected to store the next word.

Having stored information in the array, the read out of the stored data remains to be explained.

At some selected time shown as $t_{20}$ in FIG. 4, readout of one row of the memory is begun. A negative going pulse is applied to line 523 as shown in waveform 5. This pulse causes the potential of the column to decrease by −2 volts as shown in waveshape 6. Concurrently, a negative going pulse (+V volts to −V volts) is applied to row R1 which, for example, is the row of the memory selected to be read out. During readout, input gate transistors F11 thorugh F14 are turned off.

During the time interval from $t_{20}$ to $t_{21}$ transistors M11 through M14 have −V volts applied to their gates and −2V volts applied to that one of their electrodes (now acting as a drain) common to the column. Those memory transistors (M11, M13, M14) having −V volts at their storage nodes (JP11, JP13, JP14) do not conduct and their column (C1, C3, C4) potential remains at −2V volts. The memory transistor (M12) having zero volts or close to zero volts at its storage node (JP12) conducts transferring charge from its storage node to the column (C2). The charge stored across the storage element during the write-in period is now fed back onto the columns raising the column potential above −2V volts as shown in waveform 6. The transfer back to the columns is completed when at time $t_{21}$ the pulse on row R1 returns to +V volts and the column capactior bus goes from −V to +V volts raising the potential of each column by 2V volts.

The memory transistor is always operated in the source follower mode. During write-in the memory transistor has zero volts applied to its gate, −V volts applied to its drain (that electrode common to the storage node) and zero or more volts applied to its source (that electrode common to the column). The transistor conducts for any signal more positive than zero volts charging the storage node to a potential above −V volts. During read-out the memory transistor has −V volts applied ot its gate, the stored signal present at its source (that electrode common to the storage node) and −2 V volts at its drain (that electrode common to the column). The memory transistor conducts until its source potential (storage node) is discharged to −V volts. Thus, every read-out cycle resets the storage node to the −V volt level making it ready for the next write-in cycle.

The parallel-to-serial converter 506 circuit takes the signal present on the columns and transfers the information to the input nodes of output register 504. This is accomplished by first applying at time $t_{21}$ a negative going (+V volts to zero volts) store pulse on line 561 as shown in waveshape 9 of FIG. 4. This pulse applies zero volts to the gate of transistors F21 through F24 and couples −V volts to the drains (P15, P25, P35, P45) of transistors F21 through F24. These transistors are turned on and the signal present on the columns is transferred to the drains as illustrated for column 2 in waveform 10 of FIG. 4.

Recall that during read out the column potential is either zero volts or some slightly more positive potential. Those transistors (F21, F23, F24) whose source (C1, C3, C4) is zero volts do not conduct and their drain potential (P15, P35, P45) remains at −V volts. That transistor whose source (C2) is above zero volts conducts transferring charge from the column to the drain node. Thus, from time $t_{21}$ to $t_{30}$, as shown in waveforms 6 and 10, while the column potential decreases exponentially towards zero volts, the output store point P45 rises exponentially towards zero volts. Output gate transistors (F31...F34) isolate the output register 508 from the store points (P1S...P4S). This enables the columns to be coupled to the output store points for a relatively long time period ($t_{21}$ to $t_{30}$). This extended period permits the substantially full transfer of charge out of the higher capacitance columns to the capacitive nodes of the output store points.

The transfer from the columns to the output store points is completed at time $t_{30}$ when the output store pulse returns from zero volts to +V volts.

Output register 508 is loaded with the binary word information when transistors F31 through F34 are turned on at time $t_{30}$ by an enabling pulse generated by output gate driver 560. At time $t_{30}$, the output store bus is driven positive from 0 volts to +V volts. This raises the potential at the store points (P51 throug P54) by V volts. Therefore, P51, P53, and P54 are returned to zero volts and P52 is driven positive above zero volts.

The transfer of the data bits from the output store points to the output register is best understood by noting the following. With the output register 508 reset, junction points P2R, P4R, P6R, and P8R are normally at and remain at −V volts. The odd numbered junction points P3R, P5R, and P7R swing between zero volts and −2V volts corresponding to the transitions of the A′ clock. When output gate driver 560 energizes transistor F31 through F34, the A′ clock is at its +V volt level. The output gate driver applies a negative going pulse (+V to zero volts) to the gates of transistors F31 through F34. Those transistors (F31, F33, F34) having zero volts at their source (P1S, P3S, P4S) remain nonconducting with the result that the potential at P2R, P6R, and P8R remains at −V volts. Transistor (F32) having a positive potential at its source (P2S) conducts causing the potential at P4R to rise from −V volts towards 0 volts (see waveform 11). Correspondingly, the potential at P2S decreases exponentially towards zero volts. At time $t_{31}$, the output gate pulse returns to +V volts cutting off transistor F31 through F34, and output register 508 is now loaded with the binary information earlier stored in row R1 of the memory.

The B′ clock remains at a fixed reference level (zero volts) while the A′ clock swings +V volts and −V volts about zero volts. The clock transitions cause the pulse to advance through the output register producing an output signal as shown in waveform 12 of FIG. 4. The circuit of FIG. 4 thus illustrates a memory system using charge transfer to perform the read, write and store functions.

Charge Coupled Device Embodiment

Figure 5:
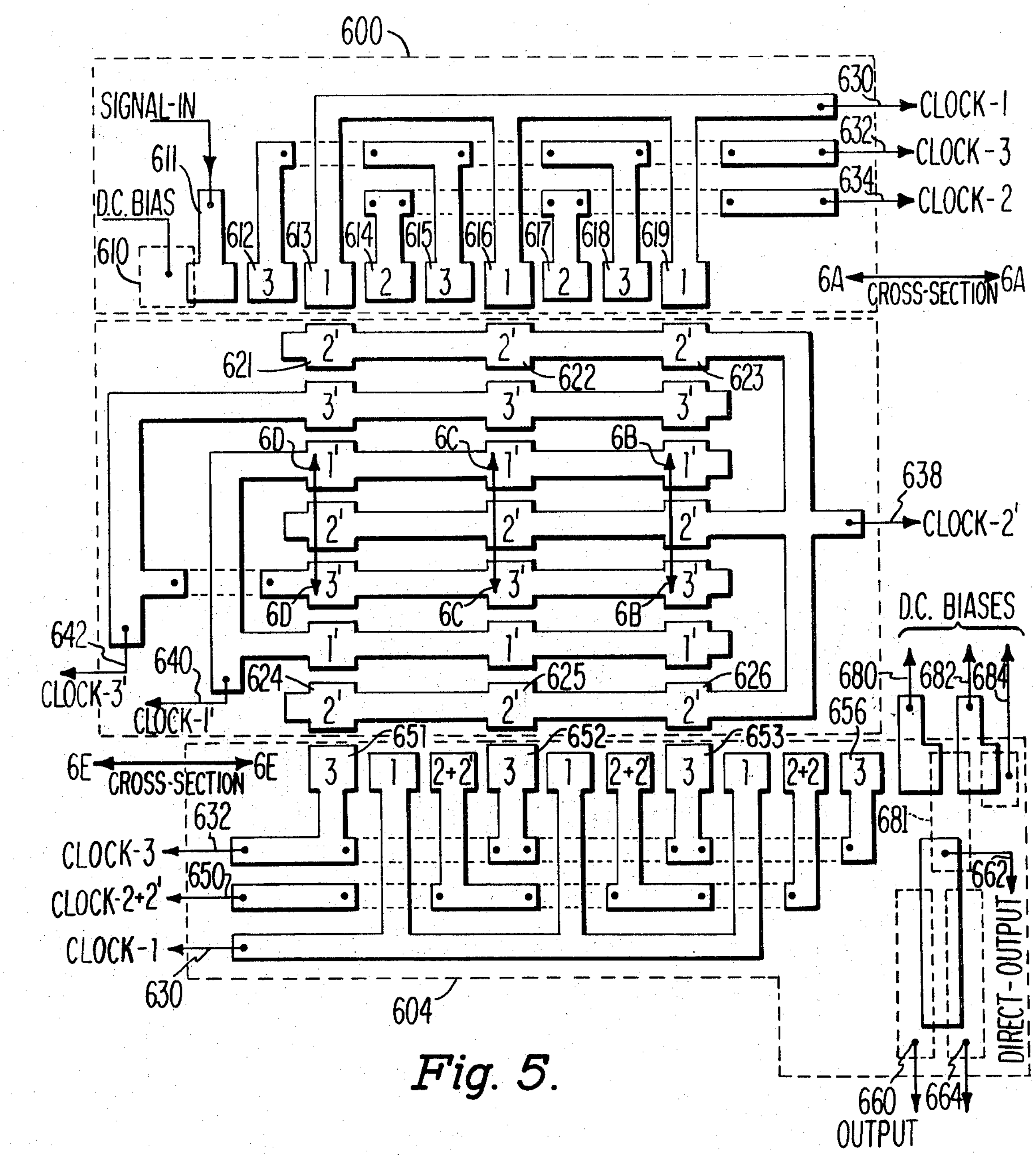
FIG. 5 is a top view of the metallization pattern of a charge coupled system embodying the invention.
Figure 6:
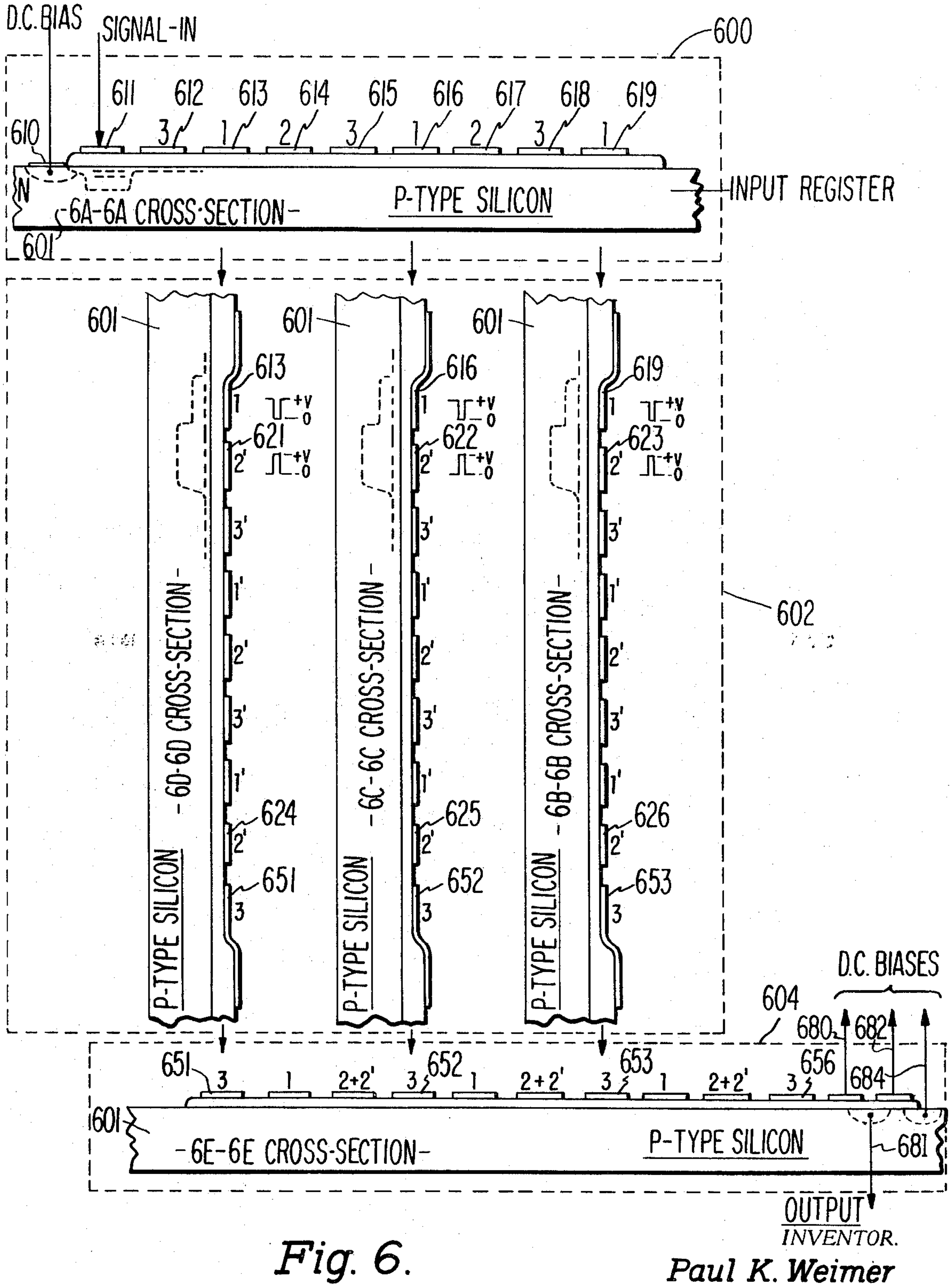
FIG. 6 is a cross section of the circuit of FIG. 5.
Figure 7:
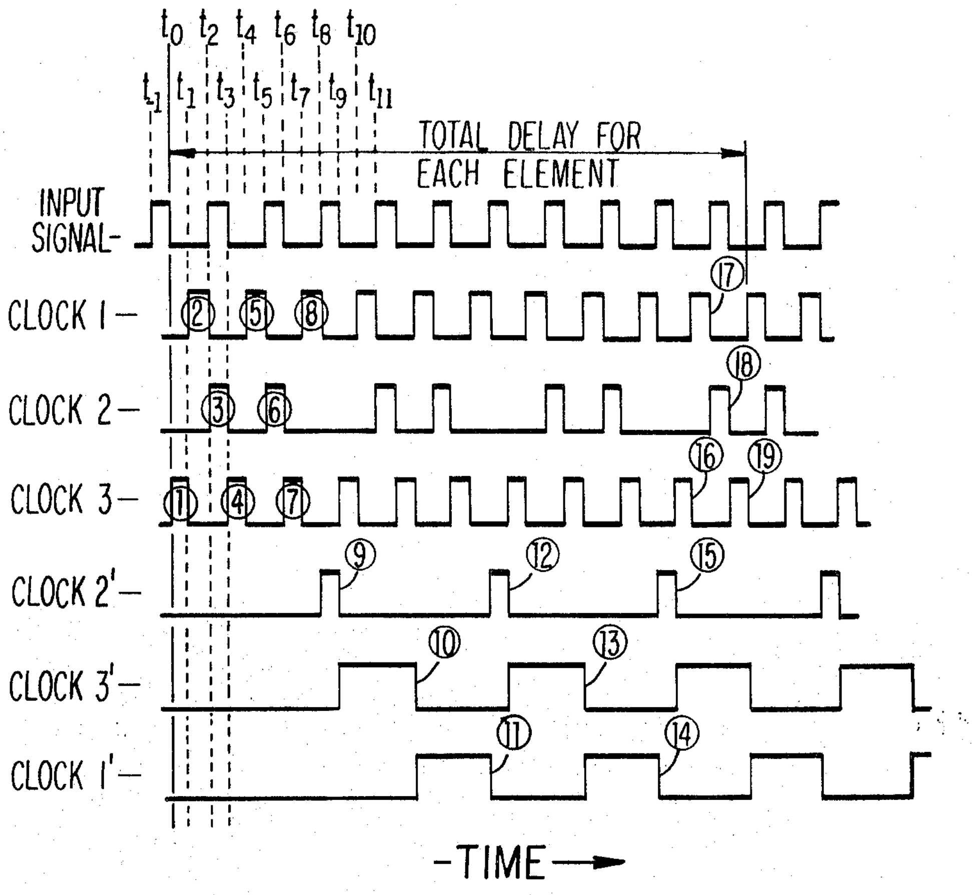
FIG. 7 is a drawing of waveforms present in the circuit of FIG. 5.

FIGS. 5, 6, and 7 illustrate the use of charge coupled devices (CCD) to form analog and digital delay lines. FIG. 5 is a top view of the metallization pattern and for ease of description is subdivided into three sections. Section 600 which includes the input row register, section 602 which includes the parallel column registers and section 604 which includes the output row register. FIG. 6 shows the cross section of the various subdivisions of FIG. 5.

Section 600 includes an electrode 610 to which a DC potential of approximately +V volts is applied for biasing the region directly beneath for forming a source of electrons. (An n channel device which is fabricated from a P-type substrate is desired here.) Adjacent to electrode 610 is signal input electrode 611 for the application thereto of signals for producing a potential well whose accumulated charge is proportional to the applied signal. Adjacent to input electrode 611 is a repetitive pattern of metal electrodes 612 through 619 driven by a three phase clock. The metal electrodes 612 through 619 are arranged in groups of three labelled 1, 2, and 3, respectively. Those electrodes denoted by the number 1 are coupled to terminal 630 to which is applied clock-1. Those electrodes denoted by the number 2 are coupled to terminal 634 to which is applied clock-2. Those electrodes denoted by the number 3 are coupled together to terminal 632 to which is applied clock-3.

Section 602 includes the column registers. Here again, the electrodes are arranged in groups of three with every third electrode coupled together. Section 602 includes three paths, each path having seven translating stages. Those electrodes denoted by 2′ are coupled together to terminal 638 to which is applied clock-2′. Those electrodes denoted by 1′ are coupled to terminal 640 to which is applied clock-1′. Those electrodes denoted by 3′ are coupled to terminal 642 to which is applied clock-3′.

Section 604 includes the output register section of the system. The metal electrodes are arranged in groups of three adapted for 3 phase operation. Those electrodes of section 604 denoted by the number 3 are coupled to terminal 632 to which is applied clock-3. Those electrodes denoted by the number 1 are coupled to terminal 630 to which is applied clock-1. The remaining electrodes denoted by 2 + 2′ are coupled together to terminal 650 to which is applied a clock signal which is the sum (logical "OR") of clock-2 and clock-2′.

There is also provided in the circuit of FIG. 5 electrodes 680, 682, and 684 to which a DC potential of +V volts is applied for detecting the presence of charge underneath electrode 656 and producing in response thereto a voltage level which can be amplified and produced at output terminals 660 and 662.

FIG. 6 shows in cross section the subdivisions of FIG. 5. The invention is illustrated using a common P-type substrate 601. A thin insulating material such as silicon dioxide ($S_iO_2$) is located on the portions of the substrate surface under which signals move. The remaining regions of the substrate are covered with a thick $S_iO_2$ layer.

In section 600 of FIG. 6 there is shown the formation of a potential well underneath electrodes 611 in response to a potential +V applied to the electrode. In Section 602 there is illustrated the transfer mode of operation. As the signal applied to electrodes 613, 616, and 619 goes to 0 volts, and the potential applied to electrodes 621, 622, and 623 goes to +V volts, the electrons flow from the regions underneath electrode 613, 616, and 619 to the corresponding regions underneath electrodes 621, 622, and 623. Before discussing the operation of the FIG. 5 and 6 arrangement, it is in order to consider the following. In response to a positive potential applied to any electrode, there is formed a depletion region in the P-type substrate underneath the electrode. That is, a positive potential repels majority carriers, holes in the case of a P-type substrate, from the surface of the substrate under the electrode. The application of a more positive potential to an adjacent electrode (e.g., 2′) causes a deeper depletion well to be formed underneath the adjacent electrode and causes the flow of minority carriers (electrons) from underneath the electrode (e.g., 1) having the less positive potential applied thereto to the region underneath the electrode (e.g., 2′) having the more positive potential applied thereto.

Thus, for a P-type silicon substrate a positive voltage applied to the metallic electrodes attract electrons to the surface of the semiconductors. These packets of electrons are then transferred along the surface by the application of a more positive potential to a subsequent adjacent metallic electrode.

The operation of the circuit will now be given with reference to the waveform diagrams of FIG. 7.

For normal delay applications, the frequency of the vertical clocks (clock-1′, clock-2′, clock-3′) is a submultiple of the horizontal clocks (clock-1, clock-2, clock-3). When the input row 600 is filled, the information contained therein must be transferred to the columns. Similarly, when the output row 604 is emptied information may be transferred thereto from the columns. These considerations determine, in part, the frequency ratio of the vertical and horizontal clocks.

A positive going input signal applied to electrode 611 at time $t_{-1}$ creates a potential well underneath it proportional to the signal level. A first positive clock-3 pulse denoted by 1 in FIG. 7 raises the potential at electrode 612 creating a potential well underneath electrode 612 and causing the electrons to flow from beneath electrode 611 to the region beneath electrode 612. A second positive going clock-1 pulse, denoted by 2 , forms a potential well underneath electrode 613 causing the electrodes to flow from underneath electrode 612 to the region underneath electrode 613. A third positive going clock-3 pulse denoted by 3 forms a potential well underneath electrode 614 causing the electrons to advance to the region underneath it. During this time interval, that is $t_2$ to $t_3$, another input signal may be applied to electrode 611 causing another signal responsive potential well to be formed. Input signals may thus be applied in synchronism with positive going clock-2 signals.

Additional positive going pulses produced by clock-1, clock-2, and clock-3 continue to advance the input signals along the input register 600. For the FIG. 5 and 6 system the pulse labelled 8 produced by clock-1 at time $t_7$ advances the input information to the regions underneath each one of the electrodes denoted by the number 1 in input register 600. That is, there is a bit of information under electrodes 613, 616, and 619.

Following pulse 8, clock-2′ applies a positive going pulse, 9, to those electrodes labelled 2′. This pulse causes a potential well to be formed underneath those electrodes denoted 2′ with the result that the bits of information present beneath electrodes 613, 616, and 619 of the input register 600 are transferred as shown in FIG. 6 to the region beneath electrodes 621, 622, and 623, respectively. Pulse 9 thus effectuates a series-to-parallel conversion of the input signal since it transfers the input signal from the series register onto the parallel paths of section 602.

The application of subsequent pulses by clock-3′, clock-1′ and clock-2′ advances the signals along paths 6B, 6C, and 6D.

Following pulse 15 generated by clock-2′ the charge corresponding to the input pulse applied at time $t_{-1}$ is located under electrode 626, the charge corresponding to the input pulse applied at time $t_2$ to $t_3$ is under electrode 625 and the charge corresponding to the input pulse applied at time $t_5$ to $t_8$ is under electrode 625. Pulse 16 produced by clock-3 causes the transfer of the electrons underneath electrodes 624, 625, and 626 to the regions underneath electrodes 651, 652, and 653, respectively. Pulse 17 produced by clock-1 causes the information present in the output register to be advanced one position and to those regions underneath the electrodes numbered 1 in output register 604. Pulse 18 produced by clock-2 causes the information to advance one more position to the regions underneath the electrodes labelled 2 + 2′. Finally, pulse 19 produced by clock-3 causes the first bit of information to be transferred to the region underneath electrode 656. The DC bias section then acts to extrude the information which is then amplified and produced at output terminal 660.

The minority carriers (electrons in this case) which were introduced at the input electrodes 610 must be removed at an output electrode in order for charge stability to be maintained at the surface of the semiconductor. A reverse-biased diffused electrode such as 662 can be used to collect the signal electrons, thus providing a "direct" output signal. Alternatively, the same electrode could be connected to the gate of an output transistor of the n-channel MOS type which is formed in the silicon near the output end of the register. In this case, electrode 662 serves merely to monitor the surface potential fluctuations caused by the arrivals of the signal electrons, and the amplified output signal would be obtained from the source of drain (660 or 664) or the adjacent MOS transistor. Since the gate of the MOS transistor draws no current, it will then be necessary to provide another diffused electrode 684 at the end of the register to collect the signal electrons emerging from the register. The insulated gate electrodes connected to leads 680 and 682 serve merely to control the dc operating potential of the register and of the gate of the output transistor.

In an analogous manner to the bucket brigade charge transfer system of FIG. 1, the circuit of FIGS. 5 and 6 may be used as an analog delay line or a digital delay line (shift register) in which the number of transfers is minimized.

Figure 8:
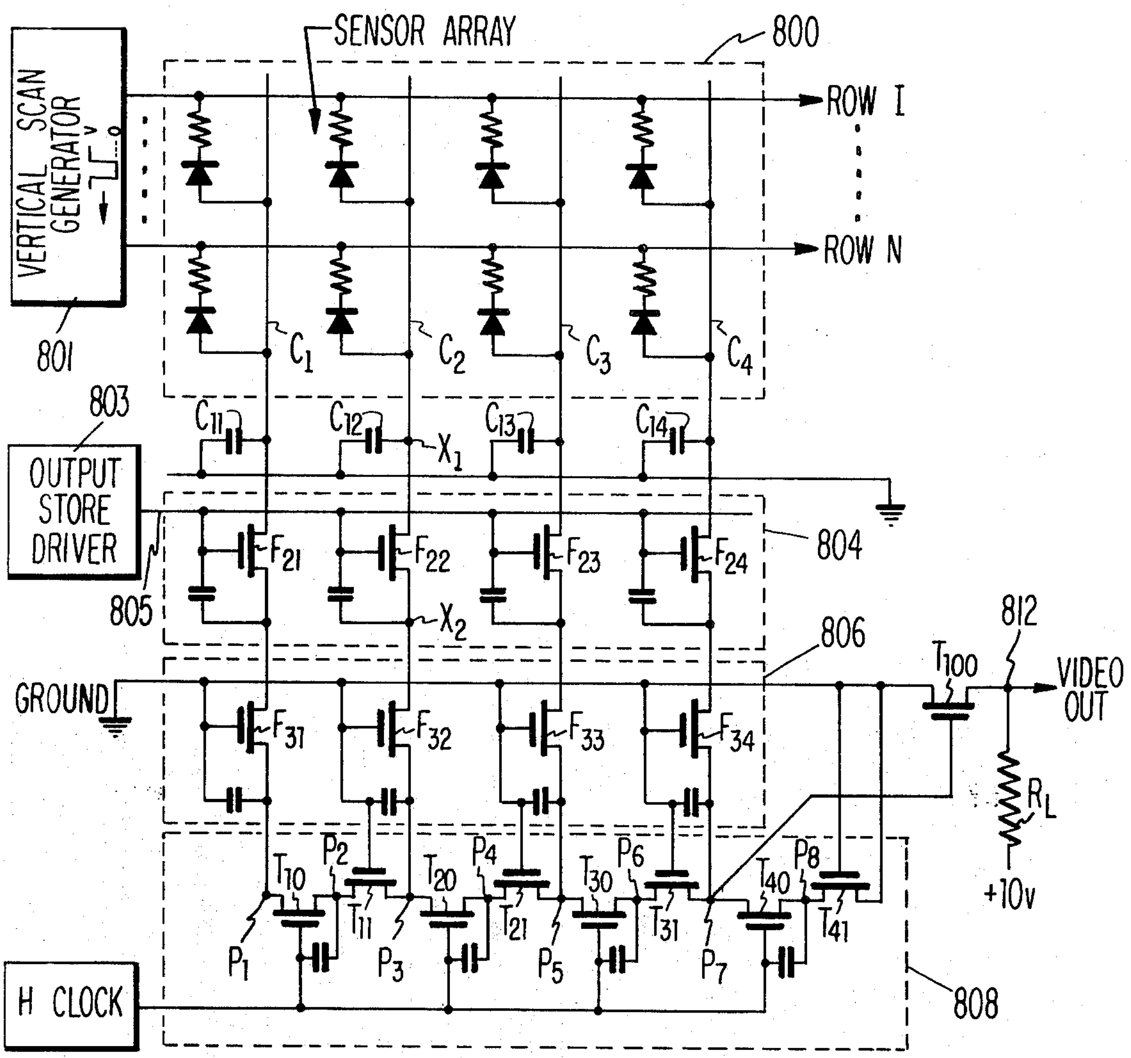
FIG. 8 is a schematic diagram of an image sensor system embodying the invention.

FIG. 8 illustrates an image sensor 800 whose elements are scanned by an *x-y* address system. The circuit of FIG. 8 illustrates how the parallel-to-series circuit portion of FIGS. 1 and 3 may serve the function of a video coupler and horizontal multiplexer in operation of an image sensor array. At the intersection of each row and column, there is a photoconductive device in series with a resistor. As is known in the art, the impedance of a photoconductor decreases in response to incident light. Therefore, when the diodes in series with the elemental photoconductors are forward biased, a current porportional to the incident light may flow through the devices.

Each row conductor of array 800 is connected to a different output of the vertical scan generator 801 which produces output pulses energizing the rows of the array one at a time. Each column (C1, C2, C3, C4) of array 800 is coupled to an input node (P1, P3, P5, P7) of output register 808 (which is identical in operation to register 508 of FIG. 3) by two series connected transistors. The first set of transistors (F21, F22, F23, F24) performs a storing function and in conjunction with the second set of transistors (F31, F32, F33, F34) which perform a gating function isolate the output register from the rows permitting the multiplexing of the information of many rows onto a single output register. Using column C2 for purposes of illustration, note that the source-drain path of transistor F22 is connected between column C2 (junction point 1) and node $X_2$ and that the source-drain path of transistor F32 is connected between nodes $X_2$ and $P_3$. In the circuit of FIG. 8, the gates of the gating transistor F31 through F34 as well as the gates of the odd numbered transistor of output register 808 are returned to ground.

Figure 9:
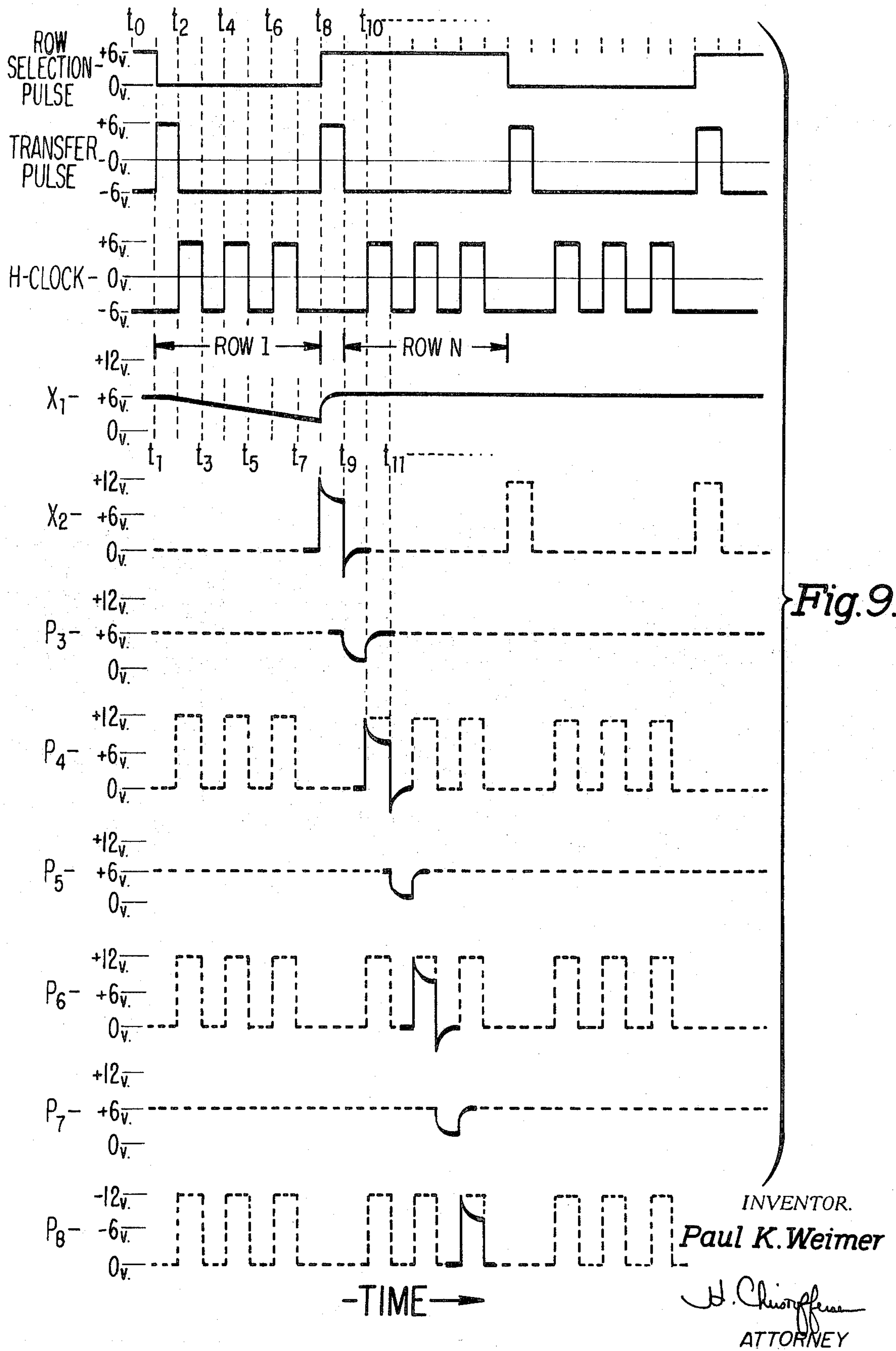
FIG. 9 is a drawing of waveforms present in the circuit of FIG. 8.

Assume now that at time $t_1$, as shown in FIG. 9, a row selection pulse generated by vertical scan generator 801 is applied to row 1 of array 800. The polarity of the signals shown in FIG. 9 assumes that the transistors of FIG. 8 are of N-conductivity type. This pulse applies a forward bias to the photoconductors of the row such that in response to incident light, an electron current will flow through the photoresponsive element in a direction to lower the column potential. That is, electrons flow from the row conductor into the column. Assume the columns to be initially recharged to +6 volt level as shown for column C2 ($X_1$) in FIG. 9. From time $t_1$ to $t_8$ each element of a selected row integrates the signal linearly discharging the column capacitors (C11, C12, C13, C14). At time $t_8$ the row selection pulse returns to +V volts and a transfer pulse generated by output store driver 803 is applied to line 805. The transfer pulse causes storing transistors F21 through F24 to be turned on and to conduct depending on the column potential. Transistors F21 through F24 transfer the negative charge from the column to their drains while simultaneously recharging the columns to +6 volts as shown for $X_1$ at time $t_8$ to $t_9$. The potential at $X_2$ is driven to +12 volts by the transfer pulse but decays due to the transfer of electrons to $X_1$. When the transfer pulse returns to zero, the potential at $X_2$ goes negative due to the transfer of charge to $X_1$. This turns on transistor F32 causing the transfer of electrons to node P3 which is an input node of output register 808. Transitions of the H clock, as shown in FIG. 9, cause the signals present at the nodes of the output register to be transferred from stage to stage. Signals present at node P7 are applied to the gate of transistor T100 which amplifies the signals producing a video output signal at terminal 812.

The circuit thus illustrates the storage of signals for one line time on the column capacitors (C11, C12, C13, C14). A transfer pulse which occurs during horizontal blanking (H-clock at −6 volts), transfers the charge to the bucket brigade output register where it is scanned off during the following line time.

The photo signals which are propagated in parallel along the columns and to the capacitors of the storing capacitors are transferred to the output register which then transfers the charge serially to the output electrode. FIG. 8 shows how a simple two-stage bucket-brigade delay line can be inserted into each output column of a line-storage sensor prior to the multiplexer thereby eliminating the mixing of signals between successive lines which tends to occur in prior art systems of this type. While the photo-currents from one row are being accumulated in the column capacitors, the photocharges from the previously scanned row which are stored in the storage capacitor are being discharged sequentially into the video output terminal.

The use of bucket-brigade or charge-coupled circuits for addressing and extracting video signals from *x-y* arrays appears to offer significant advantages over conventional addressing methods in signal-to-noise ratio and in freedom from switching transients. The sensor arrays need not be limited to photoconductors, but can utilize high gain phototransistors or photodiodes, with all video coupling and scanning circuits located on the periphery of the array. By avoiding the use of an internal register for each row or column, a more versatile sensor can be designed which operates more effectively over a wide range of lighting levels. The inherent storage capabilities of charge transfer (either bucket brigade or charge coupled) offers additional advantages in simplification of the sensor array itself, and in avoiding the vertical resolution loss in line storage systems. For example, a two-dimensional MOS-photodiode array need not have two MOS transistors at each element as normally required for conventional *x-y* addressing. The high gain of phototransistor and photoconductive arrays can be used more effectively because current can be drawn from the element for periods much longer than a single element-time.

Two major advantages of this scheme over prior art circuits are: 1) less loss in vertical resolution in line-storage sensors due to mixing of charge between successive rows; 2) switching transients are reduced and sensitivity improved since the final output signal can be voltage sampled rather than current sampled.

Furthermore, the *x-y* type of arrays are simpler to construct than are some of the internally-scanned charge transfer arrays. They can be more easily stabilized against charge-spreading caused by bright spots in the scene than can internally-scanned sensors. Photodiode sensors having one MOS transistor at each element are easy to fabricate in silicon with closely spaced elements. The entire structure including sensor and scanning circuits could be made with one diffusion and one layer of metallization. Bucket-brigade registers could be used for vertical scanning and similar charge transfer type circuits may be used for transferring the charge out of the sensor and into a bucket-brigade analog register for horizontal scanning.

In the circuits of FIGS. 1, 3, and 5 the signals are propagated along the columns in parallel. It should be appreciated that alternatively one column could be operated at a time. This would require, however, that the clocking pulse not be applied in parallel to all the columns. For example, in FIG. 1 the clock bus that carries the $H_2$ clock need not be hard wired to all the columns. Instead, each column could be coupled through a selectively controllable gate to the $H_2$ clock. This would permit one column to be clocked independently of any other column and the order in which the columns are clocked could follow any desired sequence. Signals could then be propagated along a selected column and then through the output register to the signal output terminal. Each column could thus be energized one at a time and its contents clocked through the output register.

Similarly in FIG. 3 each column could be returned through a selectively controllable gate to the input gate driver or the column driver. This would permit the columns to be clocked one at a time and in any order or sequence desired.

Likewise, in FIG. 5, the electrodes of each column could be connected through selectively controllable gates to the appropriate clock. For example, the electrodes 2′ of column 1 would be coupled to clock-2′ through its own gate and the electrodes 2′ of column 2 would be coupled to clock-2′ through a different gate and so on for the other columns. As before, this would permit each column to be operated independently of any other column.

What is claimed is:

1. The combination in a charge transfer circuit of:
a plurality of charge transfer stages connected in series for forming a serial shift register;
first clock means coupled to said serial shift register for transferring charge signals in series along said serial shift register;
a plurality of parallel registers, each one of said parallel registers comprising a multiplicity of charge transfer stages connected in series;
means connecting each one of said parallel register to a different one of the stages of said serial shift register; and
second clock means coupled to said parallel registers for transferring charge signals, in parallel, between said serial register and said parallel registers and for simultaneously shifting the charges stored in said parallel registers from stage to stage.

2. The combination as set forth in claim 1, wherein said stages of said registers comprise stages of the bucket brigade type.

3. The combination as claimed in claim 1:
wherein said serial shift register is an output register having a plurality of input nodes and an output terminal; and
wherein each one of said plurality of parallel registers is connected to a different one of said input nodes.

4. The combination in a charge transfer circuit of:
a plurality of charge transfer registers, each register comprising a plurality of charge transfer stages connected in series;
means for supplying charge signals to all of said registers; and
means for reading out said charge signals including;
a) an output register, comprised of a plurality of charge transfer stages, coupled to the last one of the stages of each of said plurality of registers; and
b) shift means coupled to said output register for shifting from stage to stage along said output register the charge signals from said last stage of said plurality of registers; and
means for shifting the charge signals stored in said plurality of registers, in parallel, from each stage to the next adjacent stage each time said output register is emptied.

5. The combination comprising:

a matrix array of elements, said array having N rows and M columns with an element being coupled between a row and a column at the intersection of said rows and columns;

an output register having at least M input nodes and an output terminal, each node adapted to receive an input signal, said register for serially propagating the signals applied at its input nodes to said output terminal;

charge transfer means coupled between each one of said M columns and one of said M input nodes for transferring in parallel the signals from said columns to said input nodes during one time interval; and means for applying clock signals to said output register for transferring the signals serially along said output register during a second time interval.

6. The combination as claimed in claim 5 wherein said charge transfer means includes two transistors per column, said two transistors having their source-drain paths connected between a column and an input point; and wherein said charge transfer means includes means for applying a transfer pulse to one of said two transistors for transferring the column signal to the drain of said one transistor and means for coupling a gating pulse to the other one of said two transistors for transferring the signal from the drain of said one transistor to said input point.

7. The combination as claimed in claim 6 wherein said matrix array is an image sensor and wherein said elements are photoresponsive elements.

8. The combination as claimed in claim 6 wherein said output register is of the bucket brigade type.

9. The combination as claimed in claim 6 wherein said matrix array is a memory array and wherein said elements are memory storage elements for storing bits of information.

10. The combination as claimed in claim 6 further including an input register having an input terminal and at least M output nodes;

charge transfer means coupled between each one of said M output nodes and one of said columns; and clock means coupled to said charge transfer means for selectively transferring signals from said M output nodes onto said M columns.

11. The combination comprising:

a matrix array of photoresponsive elements having N rows and M columns, a photoresponsive element being coupled between a row and a column at each intersection of said rows and columns;

a vertical scan generator having at least N outputs each connected to one of said N rows for energizing said rows;

an output register having at least M input nodes and an output terminal; said output register for serially propagating the signals applied to its input nodes for producing a serial output at said output terminal;

charge transfer means for coupling each one of said columns to a different one of said input node, each column being coupled to an input node by means of two transistors having their source-drain paths connected in series between a column and an input node;

means for selectively energizing said charge transfer means for transferring in parallel photo signals from said columns to their corresponding input nodes; and means for clocking said output register for advancing the signals serially.

12. The combination comprising:

a plurality of transistors, each transistor having first and second regions defining the ends of a conduction path, a control electrode and a charge storage means coupled between the control electrode and the second region;

N of said transistors having their conduction paths connected in series for forming a series transmission path, the second region of every other one of said N transistors forming an input-output point;

M parallel paths, each connected at one end to a different one of said input-output points, each path comprising W of said plurality of transistors having their conduction paths connected in series;

first means connected to the control electrode of every other one of said N transistors and second means connected to the control electrode of the remaining ones of said N transistors for alternately enabling every other one of said N transistors and then the remaining ones of said N transistors for sequentially transferring charge signals from one charge storage means to the next along said series path; and third means connected to the control electrode of every other one of said W transistors and fourth means connected to the control electrode of the remaining ones of said W transistors for alternately enabling every other one of said W transistors for transferring charge signals between said input-output points of said series path and said M paths and for concurrently sequentially transferring charge signals from one charge storage means to the next along said M paths; where M, N, and W are integers.

13. The combination as claimed in claim 12 wherein said series register is an output register having its last input-output point connected to a signal output terminal wherein said first means includes means for applying a first clock signal to said control electrode of every other one of said N transistors;

wherein said third means includes means for applying second clock signals to said control electrode of every other one of said W transistors;

wherein said second and fourth means includes means for applying a reference potential to said control electrodes of said remaining transistors; and wherein said first and second clock signals vary in amplitude about said reference potential.

14. The combination as claimed in claim 12 further including a matrix of Z row conductors, where Z is an integer, and a multiplicity of column conductors, the intersection of each row and column conductor defining a bit location, each bit location including a gating transistor and a storage element; said gating transistor being connected at its control electrode to a row conductor, at one end of its conduction path to a column conductor and at the other end of its conduction path to said charge storage element; and means coupling each one of said column conductors to a different one of said M parallel paths.

15. The combination as claimed in claim 14 wherein said charge storage element is the junction capacitance of a diode, said diode having one of its anode and cathode connected to said gating transistor and having the other one of said anode and cathode connected to a point of fixed potential having a magnitude to maintain said diode reverse biased.

16. The combination comprising:

first and second signal translating paths, each path comprising a plurality of charge transfer stages, said first path having an input terminal for the application thereto of input signals and at least one output node per stage and said second path having at least one input node per stage and an output terminal for producing thereat output signals in response to said input signals but delayed in time therefrom;

N additional signal translating paths, each path connected between a different one of the output nodes of said first path and a different one of the input nodes of said second path; each one of said N additional paths comprising a plurality of charge transfer stages;

means for applying clocking signals having a first rate to said first and second paths for serially propagating signals along said paths at said first rate;

means for selectively applying clocking pulses having a second rate to said N paths for transferring data from said first path onto said N paths and from said N paths onto said second path; and each of said paths comprising transistors having first and second regions defining the ends of a conduction path, a control electrode, and exhibiting capacitance between the control electrode and the second region of each transistor; said transistors having their conduction paths direct current connected in series, every two transistors of said first and second paths forming one charge transfer stage and the second region of every other transistor being an input or an output node.

17. A memory system comprising:

input and output signal registers, each register comprising a plurality of charge transfer stages, said input register having an input terminal for the application thereto of input signals and at least one output node per stage, and said output register having at least one input node per stage and an output terminal for producing output signals;

a plurality of charge storage elements;

a matrix of M row conductors and N column conductors, the intersection of each row and column conductor defining a bit location, each bit location including a transistor having its control electrode connected to a row conductor, one end of its conduction path connected to a column conductor and the other end of its conduction path connected to a charge storage element;

means for selectively enabling said row and column conductors for transferring charge from said columns to said charge storage elements during a write-in period, and for transferring the charge sotred in said storage elements back to said column conductors during a read-out period;

N charge transfer circuit means each connected between a different one of said output nodes of said input register and said N columns for transferring, when enabled, the information from said output nodes to said column conductors; and N other charge transfer circuit means each connected between a different one of said column conductors and a different one of said input nodes of said output register for, transferring, when enabled, the information from said column conductors to said output register.

18. The combination as claimed in claim 17 further including capacitance means connected between each column and a common point, and including means for applying pulses to said common point for selectively pulsing the column conductors.

19. The combination as claimed in claim 18 wherein each one of said N means connected between the input register and the N columns includes the conduction path of an input gating transistor connected between each column and a different one of said output nodes of said input register, and wherein the control electrodes of said input gating transistors are connected in common to an input gate line for the application thereto of control signals for selectively transferring information from said output nodes of said input register to their associated columns.

20. The combination as claimed in claim 18 wherein each one of said N means connected between said columns and said output register includes: a) two transistors having their conduction paths connected in series between a column and an input point of said output register; b) means for applying a relatively long store pulse to the control electrode of that one of the two transistors connected to the column for transferring charge from the column capacitor and the drain node of said one of the two transistors; and c) means for applying a relatively short gating pulse to the control electrode of the other one of said two transistors.

21. The combination as claimed in claim 3:

further including a plurality of charge transfer stages connected in series for forming a serial input register; said input register having a plurality of output nodes and an input terminal;

means coupling each one of said output nodes to a different one of said parallel register;

clock means having the same rate as said first clock means coupled to said input register;

wherein said first clock means produces clock signals having a frequency $f1$; and wherein said second clock means produces clock signals having a frequency $f2$ wherein $f2$ is approximately equal to $f1$ divided by the number of stages in said serial shift register.

22. The combination as claimed in claim 16:

wherein said second rate is approximately equal to said first rate divided by the number of transfer stages in said first path.

* * * * *

UNITED STATES PATENT OFFICE

CERTIFICATE OF CORRECTION

Patent No. 3,763,480 Dated October 2, 1973

Inventor(s) Paul K. Weimer

It is certified that error appears in the above-identified patent and that said Letters Patent are hereby corrected as shown below:

Col. 3, line 35: "38" should be -- 28 --

Col. 8, line 58: "function" should be -- formation --

Col. 8, line 64: "x N times" should be -- $x\sqrt{N}$ times --

Col. 9, line 64: "Q5" should be -- Q6 --

Col. 19, line 18: "clock" should be -- clocking --

Col. 22, line 40: "and" should be -- to --

Signed and Sealed this

*Eighteenth* Day of *October 1977*

[SEAL]

*Attest:*

RUTH C. MASON
*Attesting Officer*

LUTRELLE F. PARKER
*Acting Commissioner of Patents and Trademarks*